(12) United States Patent
Mustafa et al.

(10) Patent No.: US 12,179,141 B1
(45) Date of Patent: Dec. 31, 2024

(54) METHOD FOR PROCESSING A SALT SOLUTION TOGETHER WITH CARBON DIOXIDE

(71) Applicant: United Arab Emirates University, Al Ain (AE)

(72) Inventors: Jawad Mustafa, Al Ain (AE); Ameera Mohammad, Al Ain (AE); Mohsin Raza, Al Ain (AE); Ali Hassan Al-Marzouqi, Al Ain (AE); Basim Abu-Jdayil, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/587,107

(22) Filed: Feb. 26, 2024

(51) Int. Cl.
*B01D 53/14* (2006.01)
*B01D 53/04* (2006.01)
*C01B 32/50* (2017.01)
*C08B 37/00* (2006.01)

(52) U.S. Cl.
CPC ......... *B01D 53/0423* (2013.01); *B01D 53/14* (2013.01); *C01B 32/50* (2017.08); *C08B 37/0003* (2013.01)

(58) Field of Classification Search
CPC B01D 53/14; B01D 53/1475; B01D 53/1493; B01D 53/0423; B01D 2252/10; B01D 2252/103; B01D 2252/1035; B01D 2257/504; C08B 37/003; C01B 32/50
USPC ......... 95/195, 196, 205, 210, 211, 228, 236; 423/220, 225; 210/660
See application file for complete search history.

(56) References Cited

U.S. PATENT DOCUMENTS

| | | |
|---|---|---|
| 10,501,761 B2 | 12/2019 | Medoff et al. |
| 11,718,688 B2 | 8/2023 | Mohammad et al. |
| 2010/0132556 A1* | 6/2010 | Constantz ............... C01F 5/24 95/236 |
| 2018/0179069 A1* | 6/2018 | Hago ..................... C01B 32/40 |
| 2021/0002568 A1* | 1/2021 | Delmas ............... C08B 37/0057 |
| 2023/0339999 A1* | 10/2023 | Thies ................. B01D 11/0488 |
| 2024/0140807 A1* | 5/2024 | Tak ..................... C01B 32/336 |

* cited by examiner

*Primary Examiner* — Frank M Lawrence, Jr.
(74) *Attorney, Agent, or Firm* — MH2 Technology Law Group, LLP

(57) ABSTRACT

A method for processing a salt solution together with carbon dioxide is disclosed. The method comprises: extracting lignin from biomass; and treating the salt solution with the lignin residue and the carbon dioxide.

19 Claims, 6 Drawing Sheets

METHOD FOR PROCESSING A SALT SOLUTION TOGETHER WITH CARBON DIOXIDE

TECHNICAL FIELD

The present invention relates to a method for processing a salt solution, together with carbon dioxide, using lignin extracted from biomass and combined with the salt solution.

BACKGROUND

The Middle East, particularly the United Arab Emirates (UAE), is the global leader in date production. Estimated at 120 million trees, seventy percent of the world's date palm resources are located in the Middle East. In addition to being an economically significant food source, date palm trees are considered an important decorative element in the green landscapes of the UAE. As a result of this prevalence, the UAE alone generates over 1.5 million tons of agricultural and landscaping residues, predominantly consisting of date palm waste. Leaves and fronds make up the primary residual components originating from palm-related agriculture and landscaping activities.

The management of agricultural waste has long posed economic challenges for numerous nations. Furthermore, it is a significant contributor to environmental pollution with problems associated such as disposal of waste from animals, poultry, and date palm farming. Each year, the accumulation of agricultural waste is on the rise, with an average annual growth rate ranging from 5% to 19%. Moreover, the haphazard disposal and unsustainable utilization of agricultural residues result in contamination of the atmosphere, soil, and other environmental elements. The combustion of fertilizers and crop residues releases substantial quantities of noxious gases, smoke, and particulate matter, leading to severe environmental and air pollution. Additionally, animal manure contains a plethora of pathogens, parasite eggs, heavy metals, and similar contaminants. According to the World Health Organization, if waste is not properly managed, it can give rise to 32 different environmental problems. A portion of agricultural waste is directly discharged into water resources, leading to significant pollution and causing the depletion of valuable resources and financial losses.

The UAE is addressing waste management, striving to reduce landfill usage and improve recycling and waste-to-energy processes to minimize the environmental impact of waste disposal. However, the generation of date palm waste in the UAE remains a significant concern. While the date palm (*Phoenix dactylifera*) holds a revered place in UAE culture and heritage and is a key agricultural crop, the maintenance and cultivation of date palm trees result in the generation of substantial waste. One primary source of waste is the pruning of date palm trees, which produces fronds (leaves) and offshoots (suckers). Although the act of pruning is necessary for the well-being and productivity of date palm trees, it results in the generation of a considerable quantity of organic matter. In addition to pruning waste, the harvesting of date palm fruits also generates waste, including discarded or unsellable fruits, as well as fruit residues and pits. Date processing facilities, where dates are cleaned, sorted, and packaged, generate waste materials such as date pits, stems, and by-products of date syrup production. Also of consideration is that, as date palm trees reach the end of their productive life, they need to be replaced. This process results in the removal of old, unproductive trees, which creates substantial waste in the form of the entire tree, including the trunk, fronds, and roots.

The UAE takes a multifaceted approach to managing date palm waste involving recognizing that date palm waste is not merely a challenge but also a valuable resource. The UAE increasingly emphasizes the sustainable utilization of this waste. For example, date palm fronds can be used in the creation of handicrafts, furniture, and traditional building materials.

In another use, date palm residues, such as lignocellulosic biomass, are commonly processed to extract cellulose, leaving lignin as a residual byproduct. While cellulose is the primary focus of the extraction process due to its diverse applications in industries, lignin is the second most abundant polymer in plants and serves as a natural adhesive that connects cellulose and hemicellulose. Its complex polymeric structure presents opportunities for the valorisation in different fields.

Lignin is a substance that can be used in the production of certain commodity chemicals and polymers. However, at present, the economic feasibility of using lignin as a substrate for these purposes has not been fully realized, primarily because it is challenging to process lignin without facing issues of purity and uniformity. It is also challenging to identify the most optimal methods for its utilization and subsequent processing conditions. On the other hand, the cellulose fraction, another component found alongside lignin, has a broad spectrum of applications. It can be employed in the production of biofuels, such as bioethanol, as well as in the creation of cellulose acetate or glucose for further industrial processes. However, this has its own challenges. To establish a sustainable and efficient biorefinery, it is essential to generate relatively pure streams of the intermediates because this is critical for reducing the need for purification steps and minimizing waste production These purification steps often come with additional expenses, which, in turn, can undermine the overall cost-effectiveness of the production process.

The management of agricultural waste is not the only environmental challenge facing the Middle East. As approximately 96-97% of the Earth's water is found as seawater, desalination technology is an appealing solution for meeting the demand for drinking water in the UAE and other countries in the region where freshwater resources are scarce. Desalination processes result in the production of purified water, but also the generation of waste brine with high salinity and the release of greenhouse gas emissions (GHG). Desalination generates a significant amount of discarded brine daily, where 1.5 L of brine is produced for every 1 L of fresh water. Typically, this brine is disposed of in the sea, harming marine life and water quality. Various brine treatment methods are available, but these methods have limitations, including high energy consumption, low performance, limited scalability, and high costs, making them unsustainable in the long term. With regards to the emissions, the combustion of fossil fuels for thermal energy and electricity generation is the main source of GHG, with carbon dioxide ($CO_2$) being the primary component. Failing to address these environmental concerns in the long term is will mean that sustainable operation of desalination technology is untenable.

Like all regions and countries of the world, the UAE is faced with global warming and climate change as two of the most critical and pressing issues. These phenomena are intricately linked, with global warming acting as a key driver of climate change. At the heart of this environmental crisis lies the issue of greenhouse gases, with $CO_2$ standing out as the primary and most influential contributor to the escalating problem. $CO_2$ capture is an imperative practice, particularly in regions like the Middle East, where many countries are known for energy-intensive industries and heavy reliance on fossil fuels, which are significant emitters of $CO_2$. For instance, approximate of 16,000 tons of $CO_2$ is calculated to be discharged daily from diverse desalination processes in the UAE. The repercussions of these emissions on global climate change and rising temperatures have far-reaching implications, such as water scarcity and potential sea-level rise within the UAE. However, as a signatory to international climate agreements, the UAE is committed to curbing carbon emissions and limiting global temperature increases, necessitating proactive measures in $CO_2$ reduction and capture and strategies aimed at developing low-carbon industries. Carbon capture and storage are emerging as pivotal tools for curbing emissions from both traditional and emerging sectors.

Three primary techniques are employed for capturing $CO_2$: pre-combustion, post-combustion, and oxyfuel combustion. Pre-combustion and oxyfuel combustion entail the use of oxygen for fuel combustion to generate electricity, enabling the production of elevated $CO_2$ concentrations compared to the use of ordinary air. This concentrated carbon dioxide can be transformed into a liquid for the purposes of transportation, utilization, and storage. Furthermore, this approach allows for the recycling of flue gases to further enhance $CO_2$ concentration. Alternatively, the post-combustion procedure involves the passage of flue gas through several subsequent processing phases to capture and retain the $CO_2$. Due to its capacity for seamless integration into pre-existing industries, post-combustion is often deemed a more economically viable alternative to pre-combustion.

Different methods are widely employed for $CO_2$ capture, including adsorption, biotechnological materials, membranes, and absorption. Absorption represents a well-established industrial procedure that utilizes various solvents, such as amine solutions, with monoethanolamine solvent demonstrating a very high $CO_2$ recovery rate of 98%. Adsorption, on the other hand, utilizes a variety of adsorbents, with zeolites and activated carbon being the most commonly used materials. Additionally, metal-organic frameworks and carbon nanotubes have been explored for the same purpose, with research indicating that nitrogen doping in carbon nanotubes is especially effective.

Inorganic and polymeric membranes have also been extensively studied for $CO_2$ separation, with performance improving as the number of stages increases. The selection of membrane types is contingent upon factors such as selectivity and permeability. Various types of polymeric membranes, including polysulfone, polyetherimide, polyimide, polyethersulfone, poly-dimethylphenylene oxide, and polyacrylonitrile, have been investigated for their ability to achieve high $CO_2$ capture efficiency. In applications where pressure drop is substantial, inorganic membranes are preferred due to their high mechanical strength. Commonly reported inorganic membrane materials for $CO_2$ capture include titania, silicon carbide, alumina, zeolite, and zirconia.

An alternative approach to $CO_2$ capture involves synthetic or natural mineralization, where $CO_2$ reacts with silicates to form carbonates. This method is considered both safe and sustainable. Various chemical and biological catalysts have been explored in the literature to accelerate carbonation reactions, such as the use of carbonic anhydrase as a biological catalyst. Researchers have tested materials like serpentine, olivine, k-feldspar, steel slag, fly ash, and phosphogypsum for carbonation, although these materials often require pre-treatment through acid dissolution and thermal activation due to their low reactivity. Electrochemical mineralization of magnesium, calcium salts, silicates, and industrial waste products has also demonstrated potential for enhancing $CO_2$ capture.

These methods for $CO_2$ capture do come with limitations. They can be energy-intensive, economically challenging to implement, and dependent on specific costly materials. Additionally, some methods may have environmental consequences, require significant space, and demand further technological development for scalability and reliability. The success of these approaches also hinges on supportive policies and frameworks.

SUMMARY

A method for processing a salt solution together with carbon dioxide is disclosed. The method comprises: extracting lignin from biomass; and treating the salt solution with the lignin residue and the carbon dioxide. Extracting the lignin comprises: deriving, by immersing the biomass in a basic solution of at least sodium hydroxide (NaOH), a lignin-containing solution from the biomass; and separating out a lignin residue from the lignin-containing solution. Once the lignin has been separated, the excess reagent is left with cellulose that has also been extracted from the biomass. Treating the salt solution comprises: combining the lignin residue with the salt solution to form a basic suspension having at least the lignin and the salt solution as constituents; passing carbon dioxide through the basic suspension so that at least a portion of the carbon dioxide reacts with the constituents to form bicarbonate ions ($HCO_3^-$) in the basic suspension and thereby cause ions to be adsorbed on the surface of the lignin present in the basic suspension to form precipitated salts; and separating the lignin and precipitated salts out from the treated basic suspension to produce a treated salt solution. In certain examples, the precipitated salts may be present on the surface of the lignin.

In some examples, the reacting of the carbon dioxide with the constituents will form carbonate ions ($CO_3^{2-}$) from the bicarbonate ions. In certain examples, one or more of magnesium ions ($Mg^{2+}$), sodium ions ($Na^+$), calcium ions ($Ca^{+2}$), and sulphate ($SO_4^{2-}$) may be adsorbed on the surface of the lignin. For example, brucite ($Mg(OH)_2$), sodium bicarbonate ($NaHCO_3$), calcium carbonate ($CaCO_3$), and calcium sulphate ($CaSO_4$) may precipitate from the basic suspension.

The biomass may comprise plant-based waste. The plant-based waste may be crushed, ground, or chopped into particles prior to immersion in the basic solution. The particles may be approximately 120 μm in size. In certain examples, the biomass comprises date palm waste.

The biomass may be dried prior to immersion in the basic solution. The plant-based waste may be dried at 105° C. The plant-based waste may be dried for 24 hours in an air-circulating oven.

The sodium hydroxide may be present in the basic solution at approximately 1 wt. % to approximately 2 wt. %. In certain examples, sodium hydroxide is present in the basic solution at approximately 2 wt. %.

The basic solution may be of sodium hypochlorite (NaOCl). That is, in certain examples, the basic solution may be of sodium hydroxide and sodium hypochlorite. The sodium hypochlorite may be present in the basic solution at approximately 1 wt. %.

The ratio of weight of biomass to volume of basic solution may be 1:10. For example, the ratio of weight of biomass to volume of basic solution may be 1 g of the biomass to 10 ml of the basic solution.

The biomass may be immersed in the basic solution at approximately 90° C. for at least three hours.

The lignin-containing solution may comprise a thick slurry. The lignin-containing solution may be highly viscous. Separating out the lignin residue from the lignin-containing solution may comprises vacuum filtering the lignin-containing solution to filter out the lignin residue.

The separated lignin residue may be freeze dried. The separated lignin residue may be freeze dried at approximately −55° C. for 48 hours.

The salt solution may be an aqueous salt solution. The aqueous salt solution may comprise brine. The aqueous salt solution may comprise a saline solution. For example, the salt solution may comprise sodium chloride, in which the sodium chloride has a concentration in the brine at 60 to 80 g/L prior to combination with the lignin. the lignin residue is combined with the salt solution to form the basic suspension with 2.5 wt. % lignin content.

The lignin residue may be combined with the salt solution to form the basic suspension with 2.5 wt. % lignin content.

The carbon dioxide may be passed through the basic suspension by bubbling a carbon dioxide containing feed gas through the basic suspension.

The method may comprise collecting a treated feed gas after the portion of the carbon dioxide has reacted with the constituents. The treated feed gas may comprise a lower fractional concentration of carbon dioxide than the fractional concentration of carbon dioxide in the feed gas.

The feed gas may contain from 3% to 15% carbon dioxide. In certain examples, the feed gas contains 10% carbon dioxide. The feed gas may comprise flue gas, flare gas exhaust gas, and/or natural gas.

In certain examples, the carbon dioxide is reacted with the constituents in an inert particle spouted bed reactor (IPSBR). The feed gas may be continuously introduced at the bottom of the IPSBR as a stream of the basic suspension is passed through the IPSBR. Inert mixing particles may be located inside the reactor, and wherein the inert mixing particles comprise polymethyl methacrylate. The IPSBR may comprise a water jacket, and wherein the water jacket is maintained at a temperature suitable for cooling the IPSBR. For instance, the water jacket may be maintained at a temperature of 20° C.

Separating lignin and/or precipitated salts from the treated suspension may comprises filtration, sedimentation, or chemical recovery. Separating lignin and/or precipitated salts from the treated suspension may comprise freeze drying.

In certain examples, the treated salt solution may be used in oil recovery by the water flooding process. The treated salt solution may be used to irrigate agricultural land.

Also provided is a treated salt solution produced according to any of the methods described herein.

Also provided is a treated feed gas produced according to any of the methods described herein.

Also provided are one or more precipitated salts produced according to any of the methods described herein.

Further optional features are described herein and a selection of those features are set out in the dependent claims.

BRIEF DESCRIPTION OF THE DRAWINGS

Further features of the disclosure are described hereinafter, by way of non-limiting examples of the invention, with reference to and as illustrated in the accompanying drawings, in which.

DETAILED DESCRIPTION

The Applicant has conceived, developed, and tested a process that allows the addressing of three environmental issues at the same time, namely: finding a use for plant waste (in this case date palm waste), managing high-salinity water or brine outputs (for example, outputs from desalination plants), and capturing carbon dioxide. The process addresses three challenges in that are of particular interest to the Middle Eastern region. The Applicant expects that the process disclosed herein will have a significant impact on all three areas of environmental technology, namely, management of agricultural waste, management of saline water outputs, and the desire to manage carbon dioxide in the atmosphere.

Figure 1:
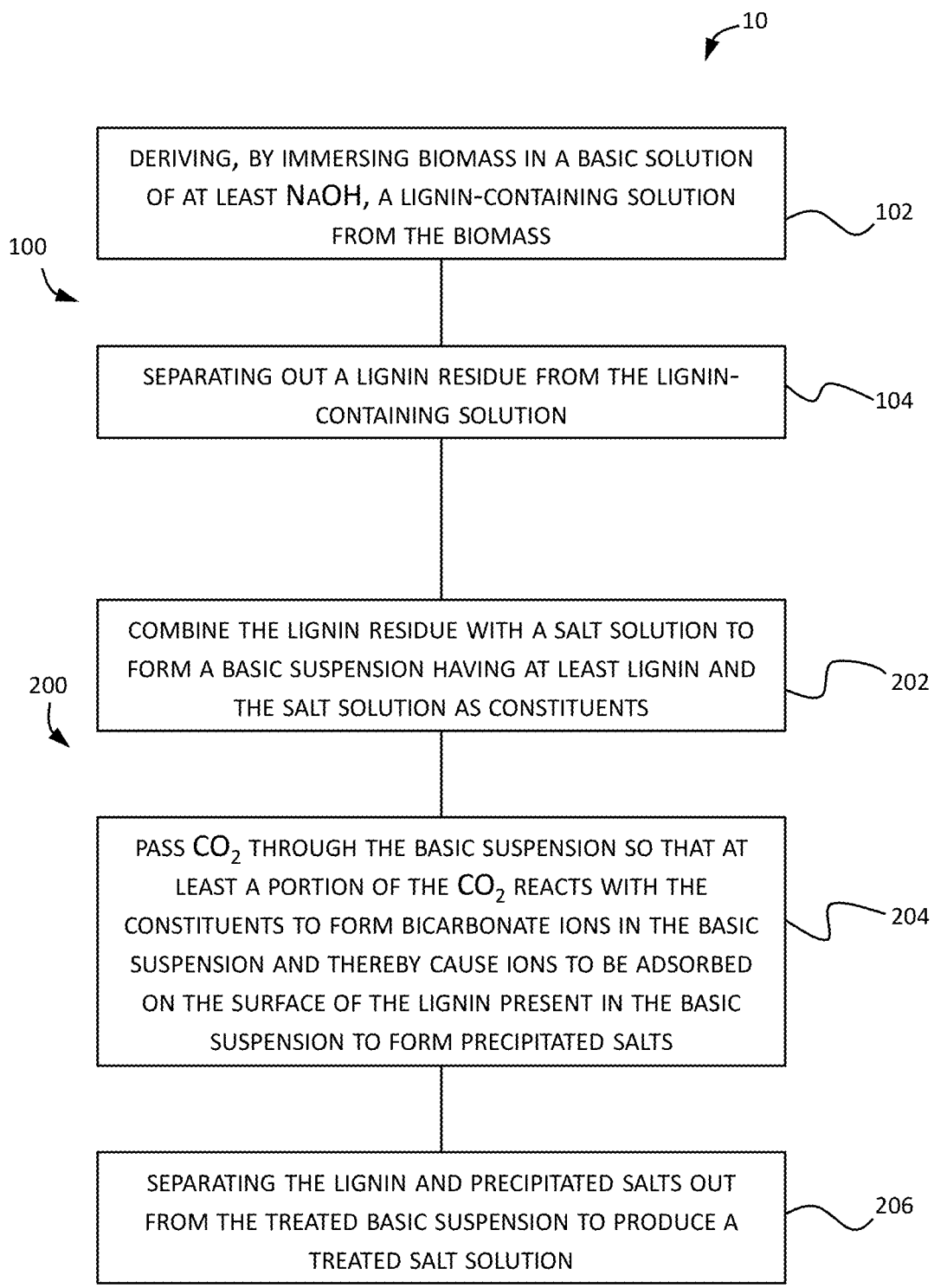
FIG. 1 flowchart that illustrates a method for processing a salt solution together with carbon dioxide.

FIG. 1 is flowchart that illustrates the method 10 developed for processing a salt solution together with carbon dioxide. The method comprises extracting 100 lignin from biomass; and treating 200 the salt solution with the lignin residue and the carbon dioxide. In one particular example, the biomass comprises date palm waste, which the Applicant considers to be particularly applicable to the method. Other plant-based waste or food waste may be used in the method. Lignin is an organic compound (polymer) that can be obtained from plant-based waste.

To extract 100 the lignin from the biomass, at block 102, the biomass is immersed in a basic solution of at least sodium hydroxide (NaOH) to derive a lignin-containing solution from the biomass. The basic solution may be of other constituents. For example, the Applicant has found that a solution of sodium hydroxide and sodium hypochlorite (NaOCl) may be effective. The sodium hydroxide may be present in the basic solution at approximately 1 wt. % to approximately 2 wt. %. For example, the sodium hydroxide may be present in the basic solution at approximately 2 wt. %. Where used, the sodium hypochlorite is present in the basic solution at approximately 1 wt. %. In one example tried by the Applicant, the basic solution was approximately 1 wt. % sodium hydroxide and approximately 1 wt. % sodium hypochlorite. Plant-based waste may be crushed, ground, or chopped into particles prior to immersion in the basic solution. For example, the particles may be approximately 120 μm in size. The plant-based waste may be dried prior to immersion in the basic solution.

At block 104, lignin residue is separated out from the lignin-containing solution. Excess reagent may be left along with cellulose that has also been extracted from the biomass. The cellulose can find other uses in industry and agriculture. Separating out the lignin residue from the lignin-containing solution can be performed using vacuum filtering of the lignin-containing solution. This can leave a thick slurry of lignin residue solution that may then be then freeze dried. The high viscosity of the lignin residue can enhancing the contact time of $CO_2$ gas in the salt solution and improve $CO_2$ capture efficiency. Freeze drying can allow the lignin residue to be stored until used later in the method.

Treating 200 the salt solution comprises, at block 202, combining the lignin residue with the salt solution to form a basic suspension having at least the lignin and the salt solution as constituents. The basic suspension may comprise other constituents. The lignin residue may be combined with the salt solution to form the basic suspension with 2.5 wt. % lignin content. The salt solution may be brine or high salinity water, for example one of the output streams of a desalination plant.

At block 204, carbon dioxide is passed through the basic suspension so that at least a portion of the carbon dioxide reacts with the constituents to form bicarbonate ions ($HCO_3^-$) in the basic suspension. In certain cases, the bicarbonate ions will form carbonate ions ($CO_3^{2-}$) from the bicarbonate ions, for example due to a higher pH level of the basic suspension. The formation of the bicarbonate ions is a process that both captures carbon dioxide and causes ions to be adsorbed on the surface of the lignin present in the basic suspension and thereby cause salts to precipitate from the basic suspension. The ions may encompass both cations and anions because of the respective gain and loss of electrons. For example, in the experiments conducted by the Applicant, detailed below, the observed salt precipitations included the presence of calcium sulphate ($CaSO_4$), which therefore indicates the adsorption of anions on the surface of the lignin present in the basic suspension.

The precipitated salts may be present on the surface of the lignin. As discussed below, the Applicant has found that one or more of magnesium ions ($Mg^{2+}$), sodium ions ($Na^+$), calcium ions ($Ca^{+2}$), and sulphate ($SO_4^{2-}$) may be adsorbed on the surface of the lignin and that one or more of brucite ($Mg(OH)_2$), sodium bicarbonate ($NaHCO_3$), calcium carbonate ($CaCO_3$), and calcium sulphate ($CaSO_4$) may precipitate from the basic suspension.

In one example, the carbon dioxide is passed through the basic suspension by bubbling a carbon dioxide containing feed gas through the basic suspension. The feed gas can be any suitable gas containing carbon dioxide. Particularly beneficial may be feed gases derived from flue gas, flare gas exhaust gas, and/or natural gas.

During the reaction, cooling may be provided to a reactor in which the reaction is taking place. This may assist with improving the effectiveness of the carbon dioxide conversion and the precipitation of salts on the lignin.

At block 206, the lignin and the precipitated salts are separated out from the treated basic suspension to produce a treated salt solution. The precipitated salts may find further use in industry. The treated salt solution may be used in industry and agriculture. For instance, the treated salt solution to irrigate agricultural land. In one example, the precipitated salts may be suitable for use as a water retention agent in sandy soil for agricultural applications, improving soil moisture retention. The resulting products may find use in industries requiring high-stability materials, such as insulation production. In another example, the treated salt solution may be used in the oil industry. For example, in oil recovery by deploying the treated salt solution in a water flooding process.

The process described herein involves the dissolution of $CO_2$ in the salt solution, for example, brine, and subsequent reactions with ions on the surface of lignin material. The application of the lignin residue as an alkaline material to a salt solution such as brine results in a basic suspension (mixture) whilst also providing an adsorption surface for the reacted salts. During the reaction, captured $CO_2$ is converted into bicarbonate/carbonate ions in a chemical transformation. The exact reactions can be influence by the specific reaction conditions such as reagent concentration, temperature, and pH.

In certain conditions, carbon dioxide ($CO_2$) transforms into bicarbonate ($HCO_3^-$) due to carbon dioxide hydration. In the method described herein, the rate of reaction may be limited by the rate at which carbon dioxide transforms into bicarbonate. The lignin is particularly beneficial for this method since its addition to the salt solution increases the alkalinity of the suspension. For example, pH values of 10-11 can be achieved. The addition of the lignin to the salt solution results in the release of $OH^-$ ions in the salt solution.

With the lignin present in the suspension, the following chemical equations depict the $CO_2$ hydration reaction:

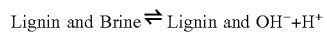

Lignin and Brine $\rightleftharpoons$ Lignin and $OH^- + H^+$

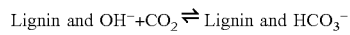

Lignin and $OH^- + CO_2 \rightleftharpoons$ Lignin and $HCO_3^-$

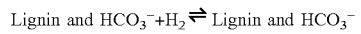

Lignin and $HCO_3^- + H_2 \rightleftharpoons$ Lignin and $HCO_3^-$

Under certain conditions, influenced by the pH of the solution, the conversion of bicarbonate to carbonate can occur spontaneously. In an alkaline environment (higher pH), the equilibrium will shift toward the formation of carbonate ions, according to the following chemical equation:

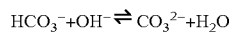

$HCO_3^- + OH^- \rightleftharpoons CO_3^{2-} + H_2O$

Based on the available $OH^-$, $HCO_3^-$, and $CO_3^-$ ions, ions will be adsorbed on the surface of the lignin from the suspension and form precipitated salts. For example, the Applicant has found that $Mg^{+2}$, $Na^{+1}$, $Ca^{+2}$, $SO_4^{-2}$ ions will be adsorbed on the surface of the lignin material and form precipitated salts such as brucite ($Mg(OH)_2$), sodium bicarbonate ($NaHCO_3$), calcium carbonate ($CaCO_3$), and calcium sulphate ($CaSO_4$).

The Applicant expects that the disclosed method will find particular benefit where there is a combination of plant based waste that requires environmentally friendly disposal in combination with a steady supply of highly saline water that requires treatment. Similarly, the need to capture and reduce the emissions of carbon is an issue that all regions of the globe are concerned about.

The UAE has explored innovative solutions for date palm waste utilization. Organic waste generated from date palm pruning and processing can be harnessed for biomass energy production. For instance, bioenergy projects can convert this waste into biogas or biofuels, aiding in meeting renewable energy goals while reducing the environmental impact of waste disposal. Composting offers another sustainable approach, as date palm waste can be composted to produce organic fertilizer, enriching soil quality for agriculture and landscaping. These waste management practices for the handling of date palm waste recognise the aim of reducing the generation of date palm waste while simultaneously enhancing its value as a valuable resource.

Similarly, addressing the challenge of rejected brine treatment is of paramount concern for the desalination industry, as it poses a significant environmental issue. Moreover, the substantial volume of rejected brine generated makes it an economically burdensome process to manage. In fact, rejected brine, date palm waste, and carbon emissions collectively represent the foremost industrial challenges faced by the UAE and the rest of the Middle East region.

The method disclosed herein capitalises on the valorisation of these three resources: rejected brine, date palm waste, and $CO_2$ emissions. By adopting this valorisation concept, the resources, which would otherwise be pollutants, can be effectively managed through a cohesive approach, independent of costly raw materials. This approach not only offers a sustainable, long-term solution for industrialization but also simplifies its application across various industries, effectively transforming waste into valuable resources. This waste-to-valorisation approach, in turn, significantly contributes to the economic and sustainable growth of the industrial sector.

Currently, some agricultural waste, particularly date palm waste, remains unused in any marketable manner. By utilizing the entire date palm, including its agricultural waste, a sustainable approach can be adopted to maximize its value and minimize waste. At present, agricultural waste remains largely unused in any commercially viable manner, and with the anticipated rise in waste production, it becomes imperative to address this concern through sustainable means. The method disclosed herein assists with fully harnessing the date palm's potential. Given its characteristic lignocellulosic composition, date palm waste stands as a promising feedstock for the production of bioproducts and biofuels. This potential can be effectively harnessed through the application of established technologies, involving various pretreatment and fractionation methods. Subsequent stages of the disclosed method may involve chemical or biological processing to produce final products like fuels, chemicals, or polymers. The disclosed method not only helps streamline the date palm management process but also make it more economically viable.

With regards to desalination, whilst the desalination processes have improved, brine waste has been overlooked, even though it contains valuable metal components. Separating these components with sufficient purity is a major challenge. There are three primary methods for brine disposal: direct reuse, direct disposal, and brine minimization. Direct disposal options like surface deep well injection, water discharge, and evaporation ponds have drawbacks, such as environmental harm and high costs. Direct reuse is suitable for industries emitting pure salts, while brine minimization is expensive due to the necessary modifications. Chemical treatment is an option for low-salinity brines, like brackish water, involving methods like seeded slurry precipitation. Membrane-based technologies, such as reverse osmosis (RO), are used for low-salinity brine treatment. However, high salinity may lead to fouling and membrane precipitation. Thermal processes like evaporators and mechanical vapor compression can also treat brine, but they suffer from low performance and high energy consumption. Membrane distillation is a relatively energy-efficient thermal process, but it still faces challenges.

Within the framework of these sustainability initiatives, a pivotal aspect that commands our attention is the comprehensive approach to waste management, which not only mitigates environmental impact but also forms a crucial facet of the UAE's journey towards a more sustainable and eco-friendly future.

The disclosed method enhances the valorisation of lignin extracted from date palm waste by integrating it into a combined desalination and $CO_2$ capture system thereby maximising resource utilization and minimising waste generation. It is expected that utilizing the entire date palm may be possible. The disclosed method also offers a sustainable solution that actively mitigates carbon dioxide emissions, addressing the environmental concerns associated with desalination technology and biomass waste. By utilizing the lignin solution for $CO_2$ capture, the process also reduces greenhouse gas emissions. The simultaneous treatment of desalination reject brine improves the environmental impact of brine disposal. The method not only addresses $CO_2$ emissions but also aids in controlling the pH of reject brine, reducing its environmental impact.

The disclosed method is also particularly effective because the extraction process ensures a higher yield of high-purity lignin. By refining the extraction parameters, such as pH, temperature, and reaction time, high pH lignin solution obtained from the extraction process plays a pivotal role in the disclosed method. The lignin serves as a crucial component for both $CO_2$ sequestration and reject brine management in the desalination process. By utilizing the alkaline lignin solution, a highly favourable environment for $CO_2$ capture through chemical absorption is created, which minimises the release of this greenhouse gas into the atmosphere. Furthermore, the alkalinity of the lignin solution aids in controlling the pH of the reject brine, reducing its environmental impact upon disposal. The integration of lignin valorisation, desalination, and $CO_2$ capture works together to enhance the overall efficiency and sustainability of the process. By combining these processes, resource utilization is maximised, and waste generation is minimized. The extracted lignin not only serves as a valuable product but also contributes to the environmental performance of the process by actively mitigating $CO_2$ emissions and addressing the challenges associated with desalination brine management.

As well as finding use in the desalination industry and numerous regional desalination plants, the resulting products of the method will find use in the agricultural industry for instance to irrigate or enhance soil quality. The energy and chemical industries may also use the method to produce lignin-derived products or treat various processes.

Experimental Analysis of Process

The Applicant has verified the process through several experiments to show that the use of lignin can produce beneficial environmental results when utilising waste biomass, such as date palm waste, to treat salt solutions, such as high salinity solutions that are expelled from desalination plants.

In one experiment performed by the Applicant, date palm waste was first crushed to 120 µm. The date palm waste was then dried in an air-circulating oven for 24 hours at 105° C.

Lignin was isolated from date palm waste using sodium hydroxide solution (2 wt. %). The solution to biomass ratio used in this experiment was 1:10 (1 g biomass into 10 ml NaOH solution). The treatment was carried out at 90° C. for 3 hours. The resulting solution was then vacuum filtered to produce a filter cake and filtrate. The filter cake was made up of cellulose, and the filtrate was thick brown slurry which was lignin. The thick brown slurry was then freeze dried at −55° C. for 48 hours.

Once the lignin was extracted, the lignin was introduced into brine to produce a suspension, which was then reacted with $CO_2$. The brine underwent a reaction with a mixture of $CO_2$ and air, along with lignin. The reaction was as per the Modified Solvay process.

Figure 2:
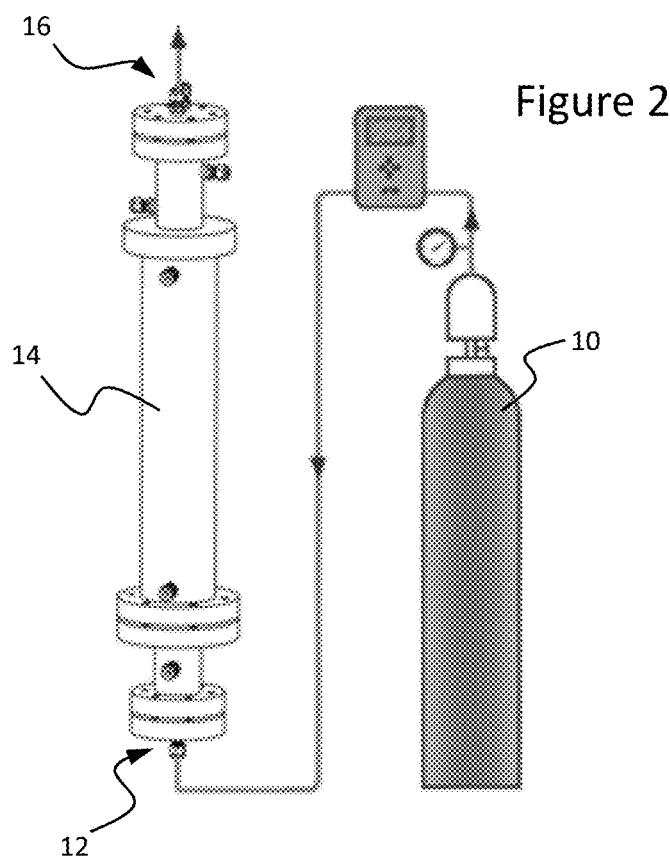
FIG. 2 is a schematic diagram schematic diagram depicting an IPSBR system utilized for an experimental reaction of brine and lignin with a gas mixture ($CO_2$ and air), as described herein.

The brine was mixed with lignin residue at specific weight percentage. The key operational unit in this case, was an inert particle spouted bed reactor (IPSBR), as shown in FIG. 2. Feed gas was supplied 10 through an inlet 12 into a reaction chamber 14 containing the suspension through which the feed gas was bubbled. A treated feed gas was expelled through an outlet 16.

An improvement in phase contact was achieved by introducing mixing particles which were inert in nature and composed of polymethyl methacrylate. To control the reaction temperature, the IPSBR system was equipped with a water jacket that maintained a constant temperature of 20° C. through continuous water circulation. The experimental procedure began by filling the IPSBR with the brine and lignin suspension. Subsequently, a continuous flow of $CO_2$ was introduced from the reactor's inlet 12. In the experiment, gas flow rate was controlled at 1000 ml/min through the utilization of a mass flow controller. Other rates may be suitable for full scale reactors. The experiment was concluded upon reaching a saturation point of the suspension. Multiple trials were performed. Following each experiment, the resultant mixture underwent freeze-drying to separate the treated brine from the solid materials and the reacted lignin. The Applicant found that obvious precipitated salts in the treated lignin sample after reaction was confirmed as light brown or tan, small to medium bulk size. This noteworthy outcome can be directly attributed to the synergistic interaction of the precipitated salts with the lignin, underscoring the effective reduction in brine salinity and marking a significant advancement in sustainable desalination processes. The Applicant validated these findings with further analysis of the solid characteristics was conducted using the analytical techniques described below.

The solids collected from the reaction involving brine, lignin, and a $CO_2$ gas mixture were subsequently freeze-dried and further analysed using various characterization techniques.

XRD Analysis: An examination of the structural features of the samples was conducted through X-ray diffraction (XRD) analysis, utilizing Cu Kα radiation with a wavelength (λ) of 1.54 Å. The pattern of diffraction emerged as the result of utilizing a tube current of 30 mA and setting the target voltage at 40 kV. Scanning encompassed the 2θ range from 5° to 70° (2θ) min$^{-1}$ to include all significant diffraction peaks. The scanning speed remained constant at 2° (2θ) min$^{-1}$. Identifying XRD diffraction peaks within the gathered samples was contingent on the theoretical intensity of the three principal peaks inherent to each mineral in its unaltered state.

SEM Analysis: Scanning Electron Microscopy (SEM) was used to characterize the surface morphology, texture, and shape of the samples. The samples, after being coated with a 300 Å gold layer, were examined in three different regions. Furthermore, an analysis using energy-dispersive X-ray spectroscopy (EDS) was conducted to identify the primary elements in each of the collected samples.

Raman Analysis: Raman spectroscopy was employed to validate the structural composition of both the initial lignin and the solid materials acquired after reacting with brine and $CO_2$ gas. The Raman analysis was conducted using a confocal microscope Raman/PL system (Model: FEX-U, NOST, manufactured in Korea) equipped with a 75% ND filter for power control and an excitation wavelength of 532 nm.

FTIR Analysis: To assess the presence of critical functional groups, the collected solids were subjected to Fourier-transform infrared (FTIR) analysis. The IRTrace-100 FTIR spectrophotometer, an instrument from Shimadzu in Kyoto, Japan, was used for these analyses. Spectral data within the range of 500 to 4000 cm$^{-1}$ were recorded with a spectral resolution of 4 cm$^{-1}$, based on an average of 34 individual scans.

TGA Analysis: To evaluate the thermal properties and decomposition behaviour of both fresh lignin and the collected solids after the reaction, we conducted Thermogravimetric Analysis (TGA). The analysis was performed using a Q50 V20.10 Build 36 TGA instrument. The samples were heated from room temperature to 600° C. at a controlled heating rate. Throughout the analysis, we continuously monitored the sample's weight changes as a function of temperature. This provided valuable insights into the temperature ranges at which different components within the solids underwent thermal decomposition or volatilization. The TGA results enhance our understanding of the samples' thermal stability and their behaviour at varying temperature conditions.

Figure 3:
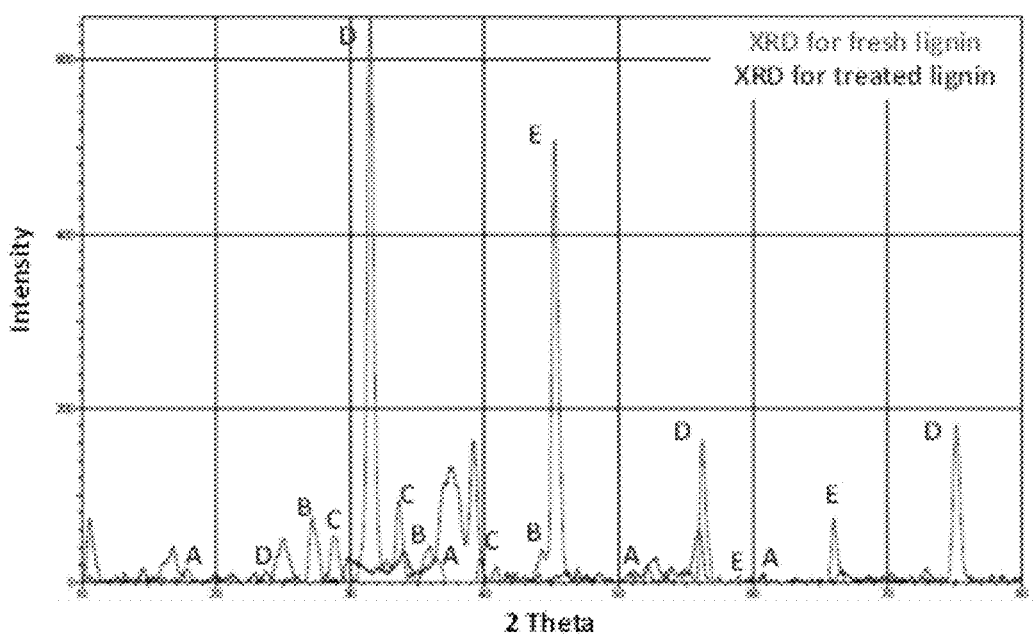
FIG. 3 is graph showing X-ray diffraction patterns of fresh lignin and collected solids after reaction with brine and $CO_2$.

XRD Analysis for the Fresh Lignin and Collected Solids from the Brine, Lignin and $CO_2$ Reaction XRD analysis results, presented in FIG. 3, confirm the recovery of magnesium content from the brine, as seen in both the untreated lignin and the post-treatment collected solids, where it appears in the form of magnesium hydroxide (Brucite, $Mg(OH)_2$).

FIG. 3 and Table 1, below, offer clear evidence of the presence of peaks associated with brucite at 2θ angles of 18.59, 38.02, and 50.85. The analysis also affirms the existence of $NaHCO_3$, $CaCO_3$, and $CaCl_2$) within the treated and collected solids. As anticipated, the recovery of $SO_4^{2-}$ products is supported by the presence of calcium sulphate (Anhydrite, $CaSO_4$), with its three most noticeable peaks located at 2θ angles of 25.5, 56.37, and 76.64.

TABLE 1

Components corresponding to each peak as presented in FIG. 3.

| Symbol | Formula | Mineral |
|---|---|---|
| A | $Mg(OH)_2$ | Brucite |
| B | $CaCO_3$ | Calcite/Vaterite |
| C | $NaHCO_3$ | Nahcolite |
| D | $CaSO_4$ | Calcium sulphate |
| E | $CaCl_2$ | Hydrophilite |

Figure 4A:
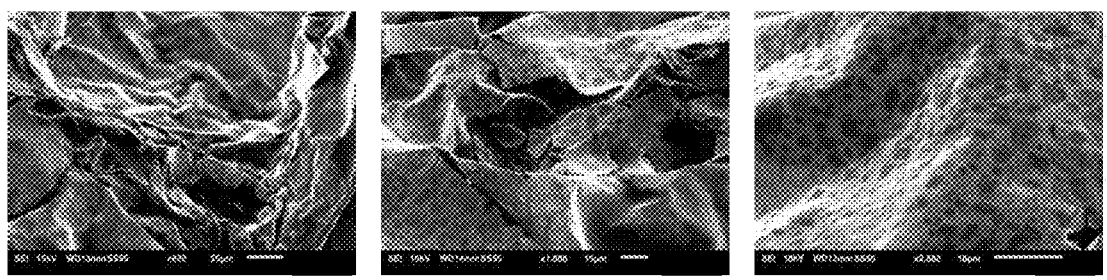
FIG. 4(a) shows SEM images for three spots on a test sample of freshly obtained lignin.
Figure 4B:
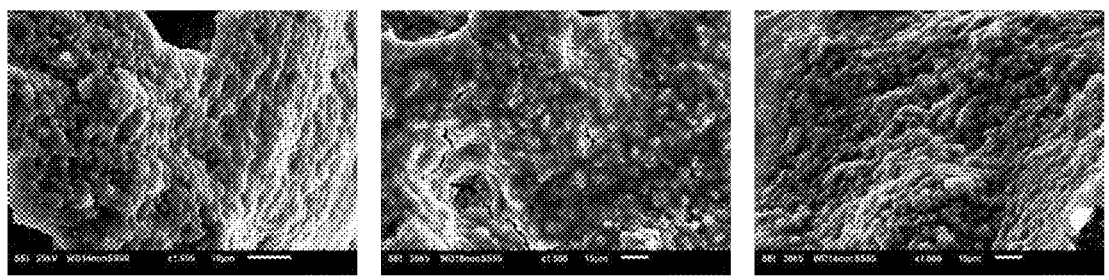
FIG. 4(b) shows SEM images for three spots on a test sample of collected solids after reaction with brine and $CO_2$.
Figure 5A:
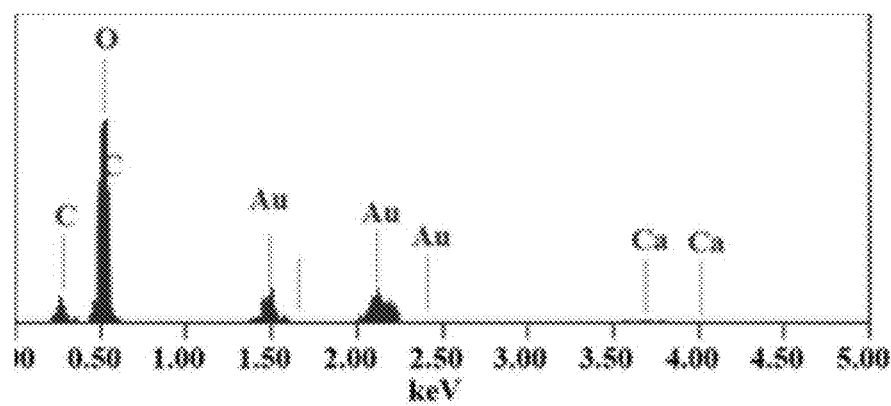
FIG. 5(a) shows EDS analysis results for the test sample of freshly obtained lignin.
Figure 5B:
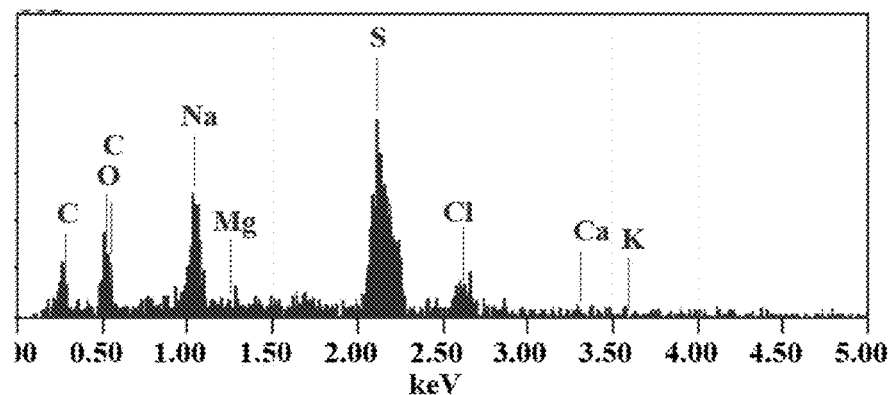
FIG. 5(b) shows EDS analysis results for the test sample of collected solids after reaction with brine and $CO_2$.

SEM Analysis of Fresh Lignin and Collected Solids from the Brine, Lignin and $CO_2$ Reaction SEM was employed to examine the structure and external morphology of both fresh lignin and collected solid samples, which were finely dried. FIGS. 5(a) and 5(b) display SEM images resulting from the examination. FIG. 4(a) shows the fresh lignin and FIG. 4(b) the collected solids for three distinct spots on each tested sample. FIGS. 6(a) and 6(b) show the EDS analysis results for each tested sample. A comprehensive comparison of the images of lignin before and after the reaction reveals significant and distinct differences in the structure, morphology, and physical properties of the collected solids.

In FIG. 4(a), SEM analysis of the solids produced from fresh lignin is presented, revealing predominantly smooth shells and clearly visible surface areas conducive to chemical precipitation reactions. While FIG. 4(b) confirms the presence of many brine salts as bulks that attached to the lignin surface. The SEM analysis reveals the presence of various components in the sample. Notably, polycrystalline vaterite ($CaCO_3$) exhibits a spherical crystal habit. Furthermore, the same figure shows the presence of sodium bicarbonate, with elongated rods that have a larger particle size when compared to calcium carbonate. The SEM image reveals an array of morphological structures, encompassing a variety of features such as moderate-sized needles, small shells, including scattering of rhombic crystals. The needle-like morphology is likely associated with the presence of $CaSO_4$ (gypsum), while the shells and lamellar structures are indicative of aluminium hydroxide.

FIG. 5(a) depicts the EDS analysis of the solids produced from fresh lignin, primarily identifying the carbon structure. In FIG. 5(b), the presence of various brine species, including magnesium, sodium calcium, potassium, sulphate, and chloride is confirmed. These ions indicate the efficiency of the chemical precipitation of the brine salts and its interaction with the lignin material.

Figure 6:
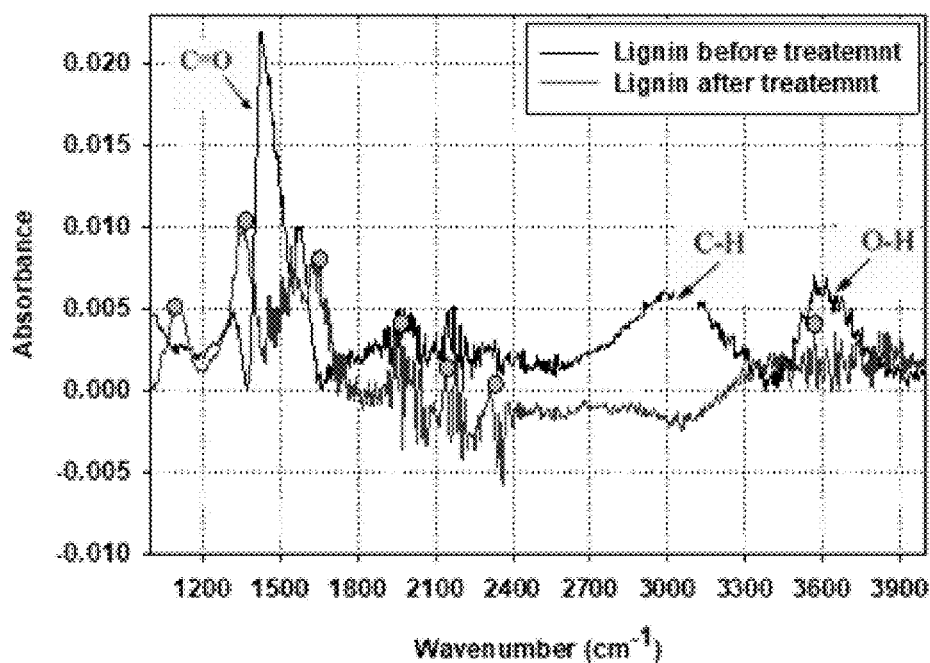
FIG. 6 shows FTIR analyses of fresh lignin and collected solids after reaction with brine and $CO_2$.

FTIR Analysis for the Fresh Lignin and Collected Solids from the Brine, Lignin and $CO_2$ Reaction Spectroscopic data were obtained within the range of 1000-4000 $cm^{-1}$, utilizing a spectral resolution of 4 $cm^{-1}$ and an average of 34 scans. FIG. 6, which shows the results of the scans, displays the distinctive absorption features characterizing the various solid samples. Notably, these features offer a clear differentiation among the different materials examined.

In the case of unreacted lignin, characteristic peaks associated with the presence of $OH^-$ groups were observed between wavenumbers 3500-3700 $cm^{-1}$, indicative of the material's reactivity with $CO_2$ gas and brine salts. Following the reaction, a noticeable decrease in the $OH^-$ group peaks was observed. Moreover, stretching vibrations of C—H bonds in the range of 2900-3100 $cm^{-1}$ were evident. The appearance of an absorption band in the region of 1400-1700 $cm^{-1}$ signalled the presence of carbonate groups ($CO_3^{2-}$) in the reacted lignin, attributed to components like calcium carbonates and potassium carbonate. Additionally, a peak associated with the C=O group was detected at 1400-1500 $cm^{-1}$ for the fresh lignin. For lignin subjected to treatment with brine and $CO_2$, the FTIR spectrum revealed prominent peaks at 3590, 1325, 1150 $cm^{-1}$, closely resembling the wavenumbers observed for pure $Mg(OH)_2$. Furthermore, peaks corresponding to $CaCO_3$ components were discerned at 1772, 1407 $cm^{-1}$. The presence of $NaHCO_3$ products was readily identified through peaks at 3718, 3428, 2889, and 1160 $cm^{-1}$, closely matching the spectral characteristics observed in its pure state. Wavenumbers of 1666, 1463, 1110, and 866 $cm^{-1}$ were attributed to the presence of $CaSO_4$, whereas wavenumbers 3487, 1415, and 970 $cm^{-1}$ possibly indicated the presence of $CaCl_2$).

Figure 7:
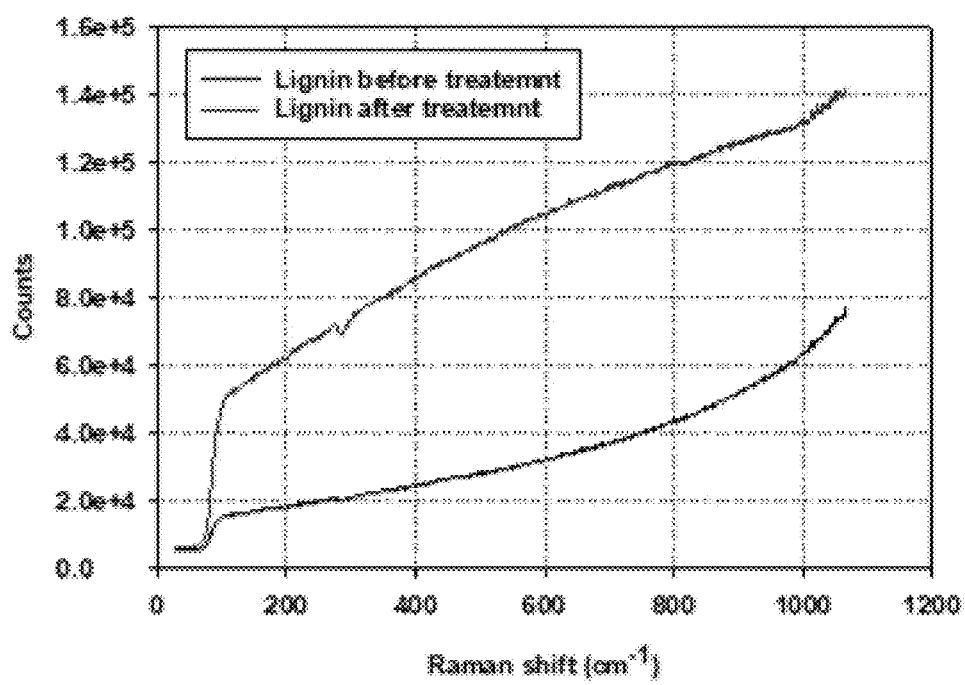
FIG. 7 shows Raman analysis for fresh lignin and collected solids after reaction with brine and $CO_2$ at Raman shift of (0-1100) $cm^{-1}$.

Raman Analysis for Fresh Lignin and Collected Solids from the Brine, Lignin and $CO_2$ Reaction Raman spectroscopy measurements were utilized to verify the structure of both fresh lignin and the collected solids following the reaction with brine and $CO_2$. Raman analysis, depicted in FIG. 7 at Raman shifts of (0-1100) $cm^{-1}$, and FIGS. 9(a) and 9(b) at Raman shifts of (2100-2850) $cm^{-1}$, respectively, highlight distinct differences in recorded intensity between the fresh lignin and the treated sample. These differences confirm the variations in composition and morphological characteristics, as illustrated in FIG. 7.

Figure 8A:
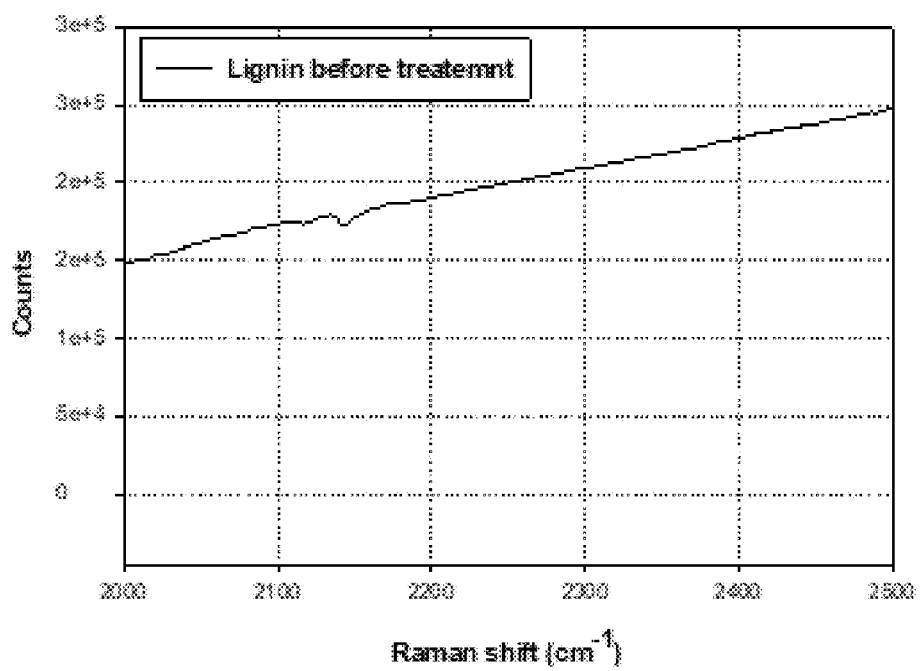
FIG. 8(a) shows Raman analysis for fresh lignin at Raman shift of (2100-2850) $cm^{-1}$.
Figure 8B:
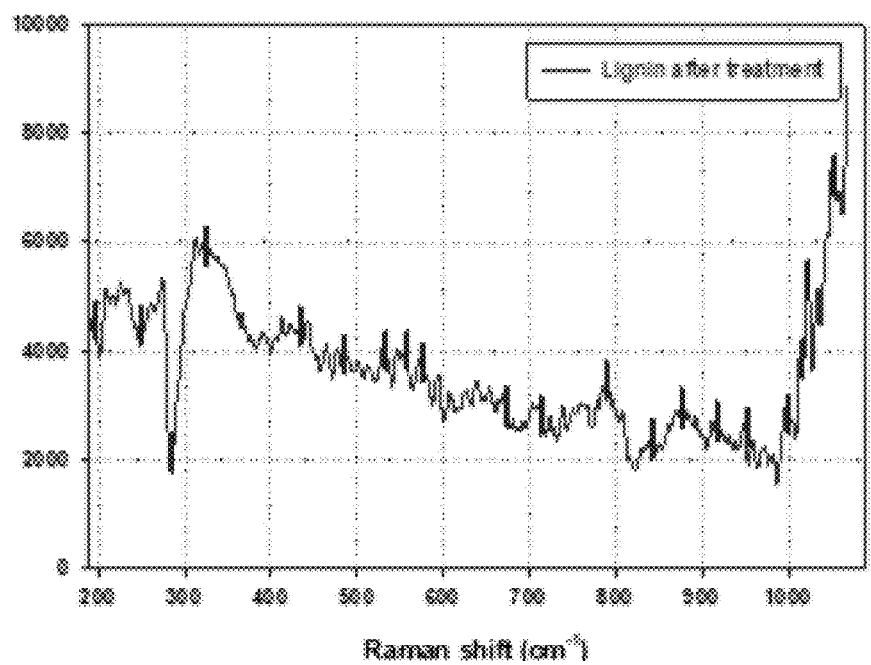
FIG. 8(b) shows Raman analysis for collected solids after reaction with brine and $CO_2$ at Raman shift of (2100-2850) $cm^{-1}$.

The Raman spectrum of the solid sample collected after the reaction of brine, lignin, and $CO_2$ (FIG. 8(b)) further validates the presence of $Mg(OH)_2$ solids. Peaks are observed at frequencies of 1070, 970, 891, 480, and 270 $cm^{-1}$, which align with the peaks documented in the Raman spectrum of $Mg(OH)_2$ as reported elsewhere in literature (see, for example, S. R. Soniya and V. M. Nair, "Synthesis and characterization of nanostructured $Mg(OH)_2$ and MgO," Int. J. Sci. Res, vol. 5, pp. 197-203, 2016). FIG. 8(b) also substantiates the presence of $NaHCO_3$ and $CaCO_3$, as evidenced by peaks at frequencies of 1060, 790, 715, 524, 213, and 195 $cm^{-1}$, which closely match the Raman analysis of pure $NaHCO_3$. The analysis revealed an expected overlap in some of the most prominent peaks, including the peak at 1060 $cm^{-1}$ for both components. Furthermore, the presence of $CaSO_3$ was verified through peaks detected at frequencies of 1023, 647, and 508 $cm^{-1}$.

Figures 9A, 9B:
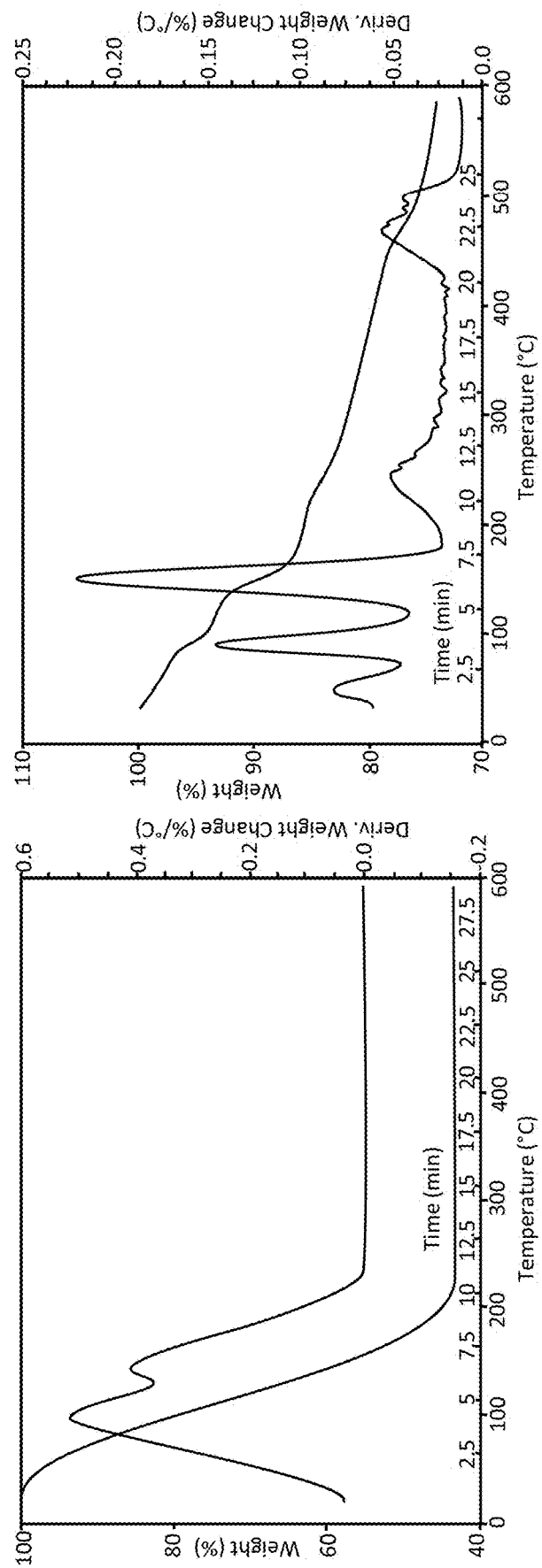
FIG. 9(a) shows TGA and DTG curves of for fresh lignin.
FIG. 9(b) shows TGA and DTG curves of for collected solids after reaction with brine and $CO_2$.

Thermogravimetric Analysis (TGA) for Fresh Lignin and Collected Solids from the Brine, Lignin and $CO_2$ Reaction Using a Q500 series thermogravimetric analyzer from TA Instruments, thermogravimetric analysis was conducted on both the untreated and treated lignin samples. Throughout the analysis, the sample's mass was continuously monitored as it reacted to changes in time and temperature during the thermodecomposition process. Derivative thermogravimetry (DTG) curves were employed to depict the rate of weight loss for each sample in relation to temperature over time. As shown in FIG. 9(a), when the temperature increased from 20° C. to approximately 200° C., there was a reduction in sample mass of about 70%. This decrease was primarily attributed to the removal of moisture and the degradation of light organic compounds. The TGA results also demonstrated a noteworthy reduction in the decomposition rate for the samples collected after lignin reaction, attributed to the presence of precipitated salts like $CaCO_3$ and $NaHCO_3$, as evident in FIG. 9(b). This suggests a substantial enhancement in the thermal stability of the treated lignin.

ANALYTICAL INVESTIGATION CONCLUSION

The analytical techniques employed in this study (SEM, EDS, XRD, Raman, FTIR and TGA) have collectively contributed to a comprehensive understanding of the changes that occurred in the solid lignin samples resulting from the reaction with brine and $CO_2$ gas mixture. These analyses confirmed the successful recovery of various brine components, including magnesium hydroxide (Brucite), calcium carbonate (Calcite/Vaterite), sodium bicarbonate (Nahcolite), calcium sulphate (Anhydrite), and calcium chloride (Hydrophilite), in addition to capturing $CO_2$ from the simulated effluent gas.

The structural disparities between fresh lignin and the collected solids, as revealed by Scanning Electron Microscopy (SEM), underscore the efficient chemical precipitation of these salts during the reaction. Furthermore, Fourier-transform infrared (FTIR) analysis demonstrated shifts in the functional groups of the fresh lignin solid samples. Notably, the depletion of OH⁻ group peaks in fresh lignin after the reaction highlighted the material's reactivity with $CO_2$ and brine salts. In addition, the treated lignin is now more stable material after reaction with brine and $CO_2$ as proved by the conducted TGA analysis. Collectively, these findings emphasize the efficacy of the chemical precipitation process in recovering a diverse range of brine salts, capturing $CO_2$ and stabilizing the lignin material highlighting its potential for resource recovery and sustainable waste management.

It will be understood that the above embodiment descriptions are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention. It is to be understood that any feature described in relation to one example may be used alone, or in combination with other features described, and may also be used in combination with any features of any other of the examples, or any combination of any other examples.

The invention claimed is:

1. A method for processing a salt solution together with carbon dioxide, the method comprising:
   extracting lignin from biomass, wherein extracting the lignin comprises:
      deriving, by immersing the biomass in a basic solution of at least sodium hydroxide (NaOH), a lignin-containing solution from the biomass; and
      separating out a lignin residue from the lignin-containing solution; and
   treating the salt solution with the lignin residue and the carbon dioxide, wherein treating the salt solution comprises:
      combining the lignin residue with the salt solution to form a basic suspension having at least the lignin and the salt solution as constituents;
      passing carbon dioxide through the basic suspension so that at least a portion of the carbon dioxide reacts with the constituents to form bicarbonate ions ($HCO_3^-$) in the basic suspension and thereby cause ions to be adsorbed on the surface of the lignin present in the basic suspension to form precipitated salts; and
      separating the lignin and precipitated salts out from the treated basic suspension to produce a treated salt solution.

2. The method of claim 1, wherein the biomass comprises plant-based waste, and wherein the plant-based waste is crushed, ground, or chopped into particles prior to immersion in the basic solution.

3. The method of claim 2, wherein the particles are approximately 120 µm in size.

4. The method of claim 1, wherein the biomass comprises date palm waste.

5. The method of claim 1, wherein the biomass is dried prior to immersion in the basic solution.

6. The method of claim 1, wherein the sodium hydroxide is present in the basic solution at approximately 1 wt. % to approximately 2 wt. %.

7. The method of claim 1, wherein the basic solution further comprises sodium hypochlorite (NaOCl).

8. The method of claim 7, wherein the sodium hypochlorite is present in the basic solution at approximately 1 wt. %.

9. The method of claim 1, wherein the ratio of weight of biomass to volume of basic solution is 1:10.

10. The method of claim 1, wherein separating out the lignin residue from the lignin-containing solution comprises vacuum filtering the lignin-containing solution.

11. The method of claim 1, wherein the separated lignin residue is freeze dried.

12. The method of claim 1, wherein the salt solution comprises brine.

13. The method of claim 1, wherein the lignin residue is combined with the salt solution to form the basic suspension with 2.5 wt. % lignin content.

14. The method of claim 1, wherein the carbon dioxide is passed through the basic suspension by bubbling a carbon dioxide containing feed gas through the basic suspension.

15. The method of claim 14, wherein the carbon dioxide is reacted with the constituents in an inert particle spouted bed reactor (IPSBR).

16. The method of claim 15, wherein inert mixing particles are located inside the reactor, and wherein the inert mixing particles comprise polymethyl methacrylate.

17. The method of claim 15, wherein the IPSBR comprises a water jacket, and wherein the water jacket is maintained at a temperature suitable for cooling the IPSBR.

18. The method of claim 1, wherein separating lignin components from the treated suspension comprises one or more of: filtration, sedimentation, chemical recovery, or freeze drying.

19. The method of claim 1, wherein the treated salt solution is used in oil recovery by a water flooding process.

* * * * *